US012442126B2

(12) United States Patent
Gregory et al.

(10) Patent No.: US 12,442,126 B2
(45) **Date of Patent: *Oct. 14, 2025**

(54) LINT CATCHING SYSTEM AND EXHAUST ASSEMBLY

(71) Applicant: ADR Products, LLC, Laramie, WY (US)

(72) Inventors: David George Gregory, Laramie, WY (US); Adrienne Francesca Szabady, Laramie, WY (US)

(73) Assignee: ADR PRODUCTS LLC, Laramie, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,323

(22) Filed: Oct. 21, 2022

(65) Prior Publication Data

US 2023/0135890 A1 May 4, 2023

Related U.S. Application Data

(63) Continuation of application No. 17/234,203, filed on Apr. 19, 2021, now Pat. No. 11,479,904, which is a continuation of application No. 16/284,580, filed on Feb. 25, 2019, now Pat. No. 10,982,378, which is a continuation of application No. 15/453,652, filed on Mar. 8, 2017, now Pat. No. 10,214,851, which is a continuation of application No. 14/194,604, filed on Feb. 28, 2014, now Pat. No. 9,593,441.

(51) Int. Cl.

| | |
|---|---|
| ***D06F 58/22*** | (2006.01) |
| ***D06F 58/20*** | (2006.01) |
| ***F26B 25/00*** | (2006.01) |

(52) U.S. Cl.
CPC .............. *D06F 58/22* (2013.01); *D06F 58/20* (2013.01); *F26B 25/007* (2013.01)

(58) Field of Classification Search
CPC ......... D06F 58/22; D06F 58/20; F26B 25/007
See application file for complete search history.

(56) References Cited

U.S. PATENT DOCUMENTS

| | | | | |
|---|---|---|---|---|
| 1,521,262 | A | 12/1924 | Wainwright | |
| 3,250,206 | A | 5/1966 | Strouth | |
| 3,479,947 | A * | 11/1969 | Myers | F24F 7/013 454/355 |
| 3,487,624 | A | 1/1970 | Tignanelli | |
| 3,999,304 | A | 12/1976 | Doty | |
| 4,034,482 | A | 7/1977 | Briscoe | |
| 4,074,466 | A * | 2/1978 | Rampe | B24B 31/06 222/161 |
| 4,121,351 | A | 10/1978 | Kapke | |
| 4,137,647 | A | 2/1979 | Clark, Jr. | |

(Continued)

FOREIGN PATENT DOCUMENTS

| | | | |
|---|---|---|---|
| EP | 2843123 | A1 | 3/2015 |
| KR | 20130005944 | A | 1/2013 |

OTHER PUBLICATIONS

U.S. Appl. No. 61/629,602, filed Nov. 22, 2011.

(Continued)

*Primary Examiner* — Jessica Yuen
(74) *Attorney, Agent, or Firm* — McDonald Hopkins LLC

(57) ABSTRACT

A lint catching system is provided for a clothes dryer. The lint catching system filters lint from exhaust air expelled from the clothes dryer.

22 Claims, 13 Drawing Sheets

(56) References Cited

U.S. PATENT DOCUMENTS

| | | | | |
|---|---|---|---|---|
| 4,183,150 | A | | 1/1980 | Nash |
| D258,609 | S | | 3/1981 | Vogt |
| 4,338,731 | A | | 7/1982 | Shames et al. |
| 4,395,831 | A | | 8/1983 | Nielsen |
| 4,434,564 | A | | 3/1984 | Braggins, Jr. |
| RE31,562 | E | | 4/1984 | Bede |
| D281,271 | S | | 11/1985 | Meyer et al. |
| D283,247 | S | | 4/1986 | Margiloff |
| 4,773,922 | A | | 9/1988 | Ross et al. |
| 4,967,490 | A | | 11/1990 | Berger et al. |
| 4,969,276 | A | | 11/1990 | Walsh |
| 5,210,960 | A | | 5/1993 | LaRue |
| 5,236,478 | A | | 8/1993 | Lewis et al. |
| 5,265,537 | A | | 11/1993 | Gasparrini et al. |
| 5,463,820 | A | | 11/1995 | La Rue |
| 5,482,507 | A | | 1/1996 | Priest |
| 5,547,422 | A | | 8/1996 | Seboldt |
| D381,480 | S | | 7/1997 | Linville et al. |
| 5,675,908 | A | | 10/1997 | Barnes |
| 5,716,271 | A | * | 2/1998 | Paidosh .................. D06F 58/20 454/359 |
| 5,755,158 | A | | 5/1998 | Wolfe et al. |
| 5,806,207 | A | * | 9/1998 | Merrigan ................ D06F 58/20 34/86 |
| 5,916,023 | A | | 6/1999 | Meyer |
| D411,901 | S | | 7/1999 | Gomulinski |
| 6,016,610 | A | | 1/2000 | Sears |
| 6,101,741 | A | | 8/2000 | Sears |
| 6,709,499 | B2 | | 3/2004 | Moschütz |
| 6,799,514 | B2 | | 10/2004 | Boatman et al. |
| 6,881,237 | B2 | | 4/2005 | Storz et al. |
| 6,966,126 | B2 | | 11/2005 | Baurmann |
| 6,971,186 | B1 | | 12/2005 | Chin et al. |
| 6,997,966 | B2 | | 2/2006 | Iantorno |
| D534,325 | S | | 12/2006 | Kramer |
| 7,213,349 | B1 | | 5/2007 | Brunner |
| 7,497,030 | B2 | | 3/2009 | Belgard |
| D689,250 | S | | 9/2013 | Zelaya |
| D717,933 | S | | 11/2014 | McClelland et al. |
| 8,893,399 | B2 | | 11/2014 | Gregory et al. |
| 9,382,658 | B2 | | 7/2016 | Tarifi |
| D770,026 | S | | 10/2016 | Morgan et al. |
| 9,593,441 | B2 | | 3/2017 | Gregory et al. |
| 10,214,851 | B2 | | 2/2019 | Gregory et al. |
| D851,343 | S | | 6/2019 | Hinchliffe |
| D890,231 | S | | 7/2020 | Suchman et al. |
| 10,969,728 | B2 | | 4/2021 | Goebel et al. |
| 10,975,516 | B2 | | 4/2021 | Bailey |
| 10,982,378 | B2 | | 4/2021 | Gregory et al. |
| D922,705 | S | | 6/2021 | Baldwin et al. |
| D930,053 | S | | 9/2021 | Suchman et al. |
| 11,479,904 | B2 | | 10/2022 | Gregory et al. |
| 2005/0252022 | A1 | | 11/2005 | Tyau |
| 2008/0022550 | A1 | | 1/2008 | Masters |
| 2010/0018071 | A1 | | 1/2010 | McKinley |

OTHER PUBLICATIONS

FEMA. Clothes Dryer Fires in Residential Buildings. Topical Fire Research Series, Jan. 2007, vol. 7, Issue 1, pp. 1-6.

Lee, et al. Measurement of Developing Turbulent Flow in a U-Bend of Circular Cross-Section. Journal of Mechanical Science and Technology, Feb. 2007, 21(2):348-359.

Amazon. Funmas 3-in-1 Indoor Dryer Vent, Stainless Steel Screen Filter, Polyester Filter and Water Drawer System, Upgrade Safety Vent Flap, with 4 Pieces Polyester Filters, For Electric Clothes Dryers. Website, http://www.amazon.com/dp/B095KG5FPT?ref=myi_title_dp&th=1, (originally downloaded May 26, 2022), dated Jun. 8, 2022, 11 pages.

Amazon. BetterVent Indoor Dryer Vent. Website, https://www.amazon.com/BetterVent-lndoor-Dryer-Vent-Kit/dp/BOOQ4X2FSM/ref=asc_df_B00Q4X2FSM/ (Year: 2015), 23 pages.

* cited by examiner

LINT CATCHING SYSTEM AND EXHAUST ASSEMBLY

I. FIELD OF THE INVENTION

A lint catching system for a clothes dryer. The lint catching system filters lint from exhaust air expelled from the clothes dryer.

II. BACKGROUND OF THE INVENTION

Conventional clothes dryers include a rotatable drum in which wet clothes are placed. During operation, the drum receives heated air which circulates through the drum as the drum rotates. The drying and tumbling of the clothes frees a large quantity of lint which is carried in the exhaust air. The dryer is equipped with a filter in the form of a mesh screen that receives the exhaust air from the drum. The mesh screen entraps a significant amount of the lint, nevertheless, the exhaust air still contains a substantial amount of lint.

The lint carried by the exhaust air includes textile fibers and other materials used in the manufacture of clothing, including naturally occurring fibers, such as cotton, wool, and linen, other non-naturally occurring fibers from materials such as SPANDEX, LYCRA, and TYVEK which further accumulate with other fibers and particles such as human and animal hair, skin cells, plant fibers, pollen, dust, microorganisms, paper, tissue, or the like, which renders the exhaust air from the clothes dryer unsuitable for direct emission into an interior room of a commercial or residential building for a variety of reasons.

Inhalation of lint, as observed in early textile workers, may lead to diseases of the lungs, such as byssinosis or may exacerbate allergies and asthma, as well as irritate the eyes, nose or throat. Microorganisms in lint can also be transferred to open wounds causing infection. Lint is also known to damage mechanical devices.

Unfortunately, conventional venting of the exhaust air from commercial or residential buildings to the external atmosphere may not be possible for a variety of reasons, including internal or external space considerations, routing of conduit to the external vent may exceed manufacturer's recommendations, resultant longer drying times, or creation of potential fire hazards. Accordingly, there may be no choice but to remove the lint from the exhaust air from the clothes dryer and vent the filtered exhaust air from the clothes dryer to an interior room of the building. A number of solutions to remove lint from the exhaust air have been proposed; however, various disadvantages with the proposed solutions remain unresolved.

Certain proposed solutions provide a conduit which receives exhaust air from the clothes dryer which has been filtered through the mesh screen and extends from the clothes dryer to a conduit outlet disposed in a container above a volume of liquid. During operation of the clothes dryer, the exhaust air delivered from the conduit outlet is directed into the liquid where the lint is to be trapped. The twice-filtered air then exits the open end of the container into the interior room.

However, the exposure of the exhaust air to liquid increases the moisture level of the exhaust air, thereby increasing humidity in the interior room and correspondingly decreasing the efficiency of the drying cycle. Additionally, in cleaning the container, the lint laden liquid cannot be disposed down a sink without the risk of drain clogging. If the liquid is not removed and cleaned at frequent intervals, the standing liquid may become moldy, resulting in noxious odors and decreased sanitation levels in the interior room and in the air entering the drum. Additionally, if the liquid is allowed to evaporate, the filter will be rendered inoperable. Moreover, the surface area of the liquid that receives lint from the exhaust air is relatively small and, as a result, has a limited ability to entrain all lint that is directed towards the liquid.

Other proposed solutions provide a conduit which receives exhaust air from the clothes dryer which has been filtered through the mesh screen and extends from the clothes dryer to a conduit outlet coupled to a filter housing which supports a filtration material. The exhaust air travels through the filtration material. The twice-filtered air then exits the filtration material into the interior room. However, the efficiency of a filter material in removing lint carried in the exhaust air from the clothes dryer can be dependent upon particular exhaust air flow characteristics developed within the filter housing supporting the filter material. Certain proposed constructional forms of the filter housing define an enclosed chamber having a volume in which the velocity of the exhaust air velocity is sufficiently reduced to allow lint or certain components of the lint to fall out of the exhaust air due to gravity or electrostatic forces to collect on the internal surfaces of the filter housing. If the filter housing is not cleaned at frequent intervals, the aggregated lint can further reduce exhaust air velocity exacerbating aggregation of lint on the internal surface of the filter housing. The aggregated lint can become moldy, resulting in noxious odors and decreased sanitation levels in the interior room and in the air entering the drum of the clothes dryer. As to other proposed constructional forms of the filter housing, the exhaust air velocity in the enclosed chamber may be sufficient to maintain lint in the exhaust air to the filter material but the lint or components of the lint may not collect on the filter due to insufficient impact inertia. As to other proposed constructional forms of the filter housing, the exhaust air velocity at the filter material may so greatly reduce the diffusion time of the lint or the lint components in the filter material that the lint or lint components pass through the filter material uncollected. As other proposed constructional forms of the filter housing, the exhaust air in the enclosed chamber may develop turbulence which affects the exhaust air velocity, which is constant but varies over the surface or through the filter material, or which is variable in relation to any particular portion of the surface of the filter material. Accordingly, a filter material, even when accorded a particular minimum efficiency reporting value ("MERV"), may not collect lint or lint components in part or in whole, or perform worse than predicted based on the MERV because of various installation conditions related to the configuration of the filter housing and not the filter material itself.

There would be a substantial advantage in a lint catching system having a filter housing configured to address the disadvantages of the above proposed constructional forms of the filter housing in relation to the effect on the efficiency of the filter material.

III. SUMMARY OF THE INVENTION

Accordingly, a broad object of the invention can be to provide a clothes dryer and method of operating a clothes dryer which include a lint filter through which exhaust air flows prior to egress into the ambient environment. As to particular embodiments of the clothes dryer, the lint filter can include a filter housing configured to define a chamber having a flat front panel wall and a flat back panel wall disposed in spaced apart relation connected by corresponding first and second side walls and first and second curved end panel walls each having a 180 degree arc disposed in opposed outwardly extending relation. The second curved end panel wall can include an exhaust aperture element and a cover element configured to removably cover a portion of the exhaust aperture element opening. The filter housing further providing a housing inlet, coupled to the first curved end panel wall, and housing outlet, disposed in the flat front panel wall configured to support a filtration material through which the exhaust air flows.

Another broad object of the invention can be to provide a clothes dryer and method of operating a clothes dryer which includes a lint filter having a filter housing which defines an interior chamber which generates a circulation of the exhaust air laden with an amount of lint which can reduce deposition of lint from the exhaust air to the internal wall of the chamber, increase deposition of lint from the exhaust air to the filtration material, enhance laminar flow of the exhaust air within the chamber, enhance the uniformity of velocity of the exhaust air across the filtration material, and generate a velocity of the exhaust air in the chamber which increases approaching the filtration material.

Another broad object of the invention can be to provide a lint filter which can be retro-fitted to devices which produce exhaust air laden with an amount of lint, including but not limited to a clothes dryer, through which exhaust air flows prior to egress into the ambient environment, which as to particular embodiments, allows exhaust air from such devices to be output into an interior building space.

IV. BRIEF DESCRIPTION OF THE DRAWINGS

V. DETAILED DESCRIPTION OF THE INVENTION

Figure 1:
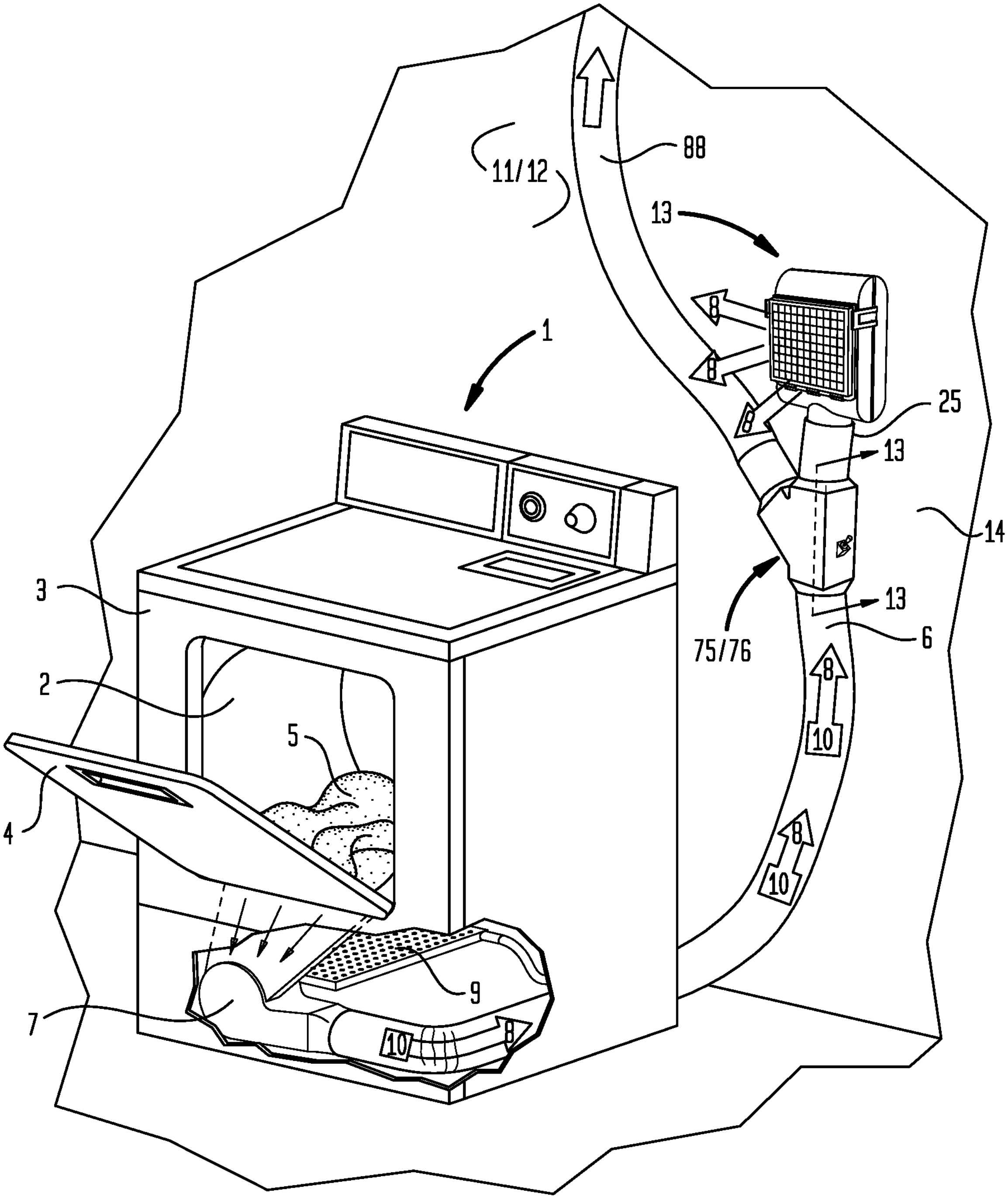
FIG. 1 is an illustration of a particular embodiment of the lint catching system for a clothes dryer.

Now referring primarily to FIG. 1, particular embodiments of the invention include a clothes dryer (1) having a rotatable drum (2) operationally disposed in a clothes dryer housing (3). A door (4) can be disposed in the clothes dryer housing (3) to allow access to the rotatable drum (2). Dryable material (5) can be introduced and removed from the rotatable drum (2) through the door (4). A conduit (6) can be coupled to the rotatable drum (2) and an air flow generator (7) disposed in the conduit (6) can move exhaust air (8) from the rotatable drum (2) through the conduit (6). A heating element (9) can be configured to heat air (10) flowing into the rotatable drum (2). The rotatable drum (2) containing dryable material (5) generates an exhaust air (8) which flows through the conduit (6) laden with an amount of lint (10).

The term "clothes dryer" for the purposes of this invention means any manner of device that moves exhaust air (8) laden with an amount of lint (10) requiring removal prior to being exhausted to an ambient environment (11), even though, particular embodiments of the instant invention are described with reference to a clothes dryer (1) of the type above described and illustrated in FIG. 1.

The term "ambient environment" for the purposes of this invention means the conditions characterizing the area, space, or atmosphere into which the exhaust air (8) is expelled and as examples, can be the area, space, or atmosphere about the exterior of a building or an interior building space (12).

The term "dryable material" for the purposes of this invention means one or more materials from which liquid can be removed by engaging a flow of air including for example: clothing, bedding, towels, fabrics, or the like along with other materials collected on the dryable material (5) such as human and animal hair, skin cells, animal dander, insect parts, mold spores, dust mite droppings, pollen, dust, paper, tissue, or the like The term "lint" for the purposes of this invention means the one or more materials carried by the exhaust air (8) from a rotatable drum (2) operationally disposed in a clothes dryer housing (3). The one or more materials including for example: textile fibers and other materials used in the manufacture of clothing, such as cotton, wool, and linen, other non-naturally occurring fibers from materials such as SPANDEX, LYCRA, TYVEK, along with other materials collected on clothing such as human and animal hair, skin cells, animal dander, insect parts, mold spores, dust mite droppings, pollen, dust, paper, tissue, or the like.

Again referring primarily to FIG. 1 the exhaust air (8) laden with an amount of lint (10) can be delivered through a lint filter (13) in accordance with the invention prior to egress into the ambient environment (11) to remove the amount of lint (10) from the exhaust air (8). As to particular embodiments, the lint filter (13) can be a part of a clothes dryer (1), part of a kit to retrofit a clothes dryer (1), or be coupled to a conduit (6) through which exhaust air (8) laden with an amount of lint (10) flows from a clothes dryer (1), or other device. As to particular embodiments, the lint filter (13) can be mounted to a support surface (14) of an interior building space (12) (as shown in the example of FIG. 1).

Figure 2:
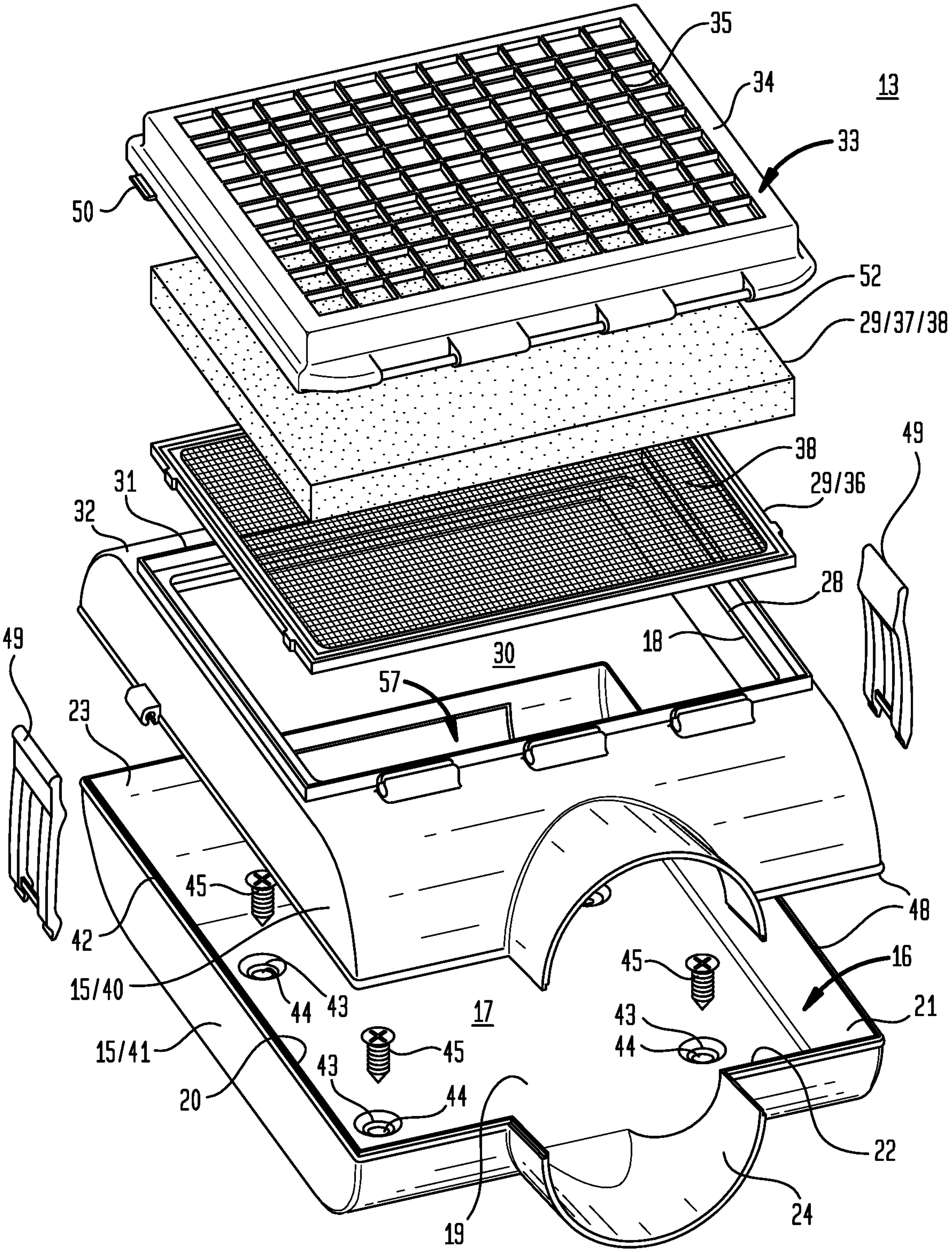
FIG. 2 is an exploded view of a particular embodiment of the inventive lint filter.
Figure 6:
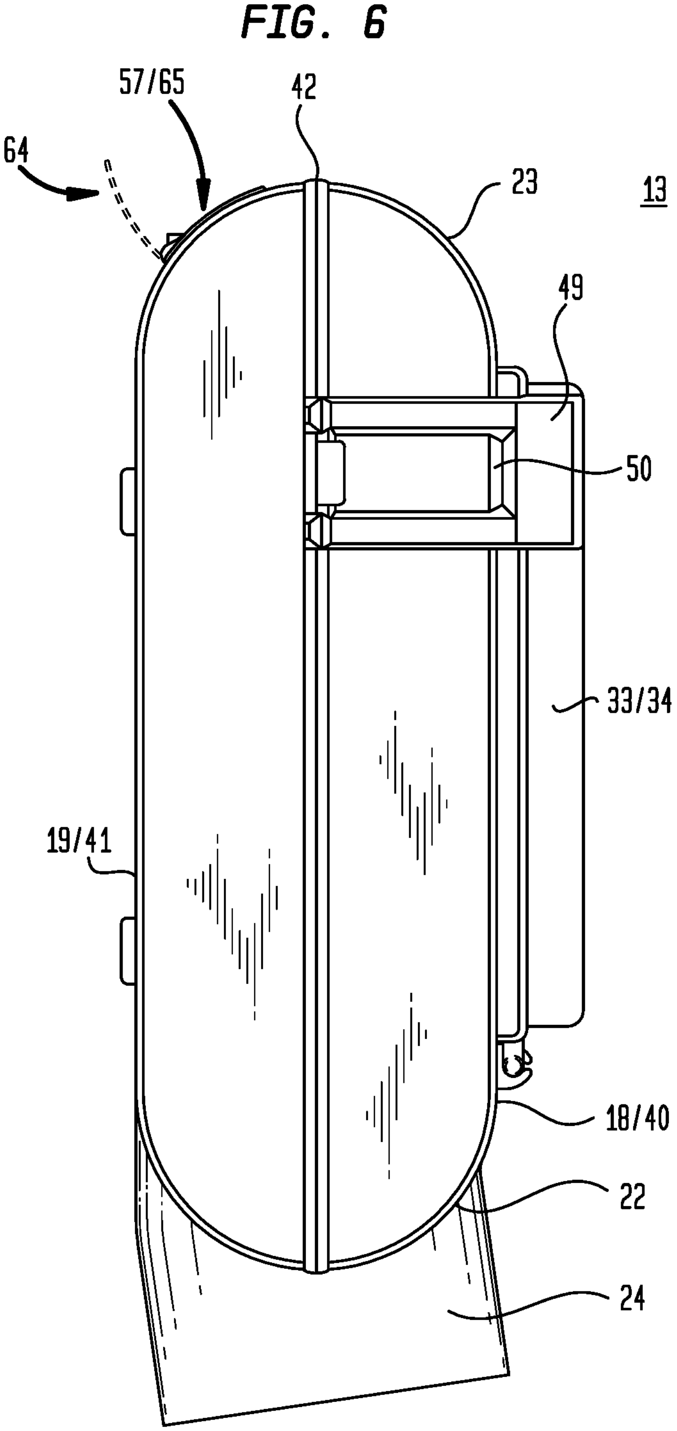
FIG. 6 is second side view of a particular embodiment of the inventive lint filter.
Figure 7:
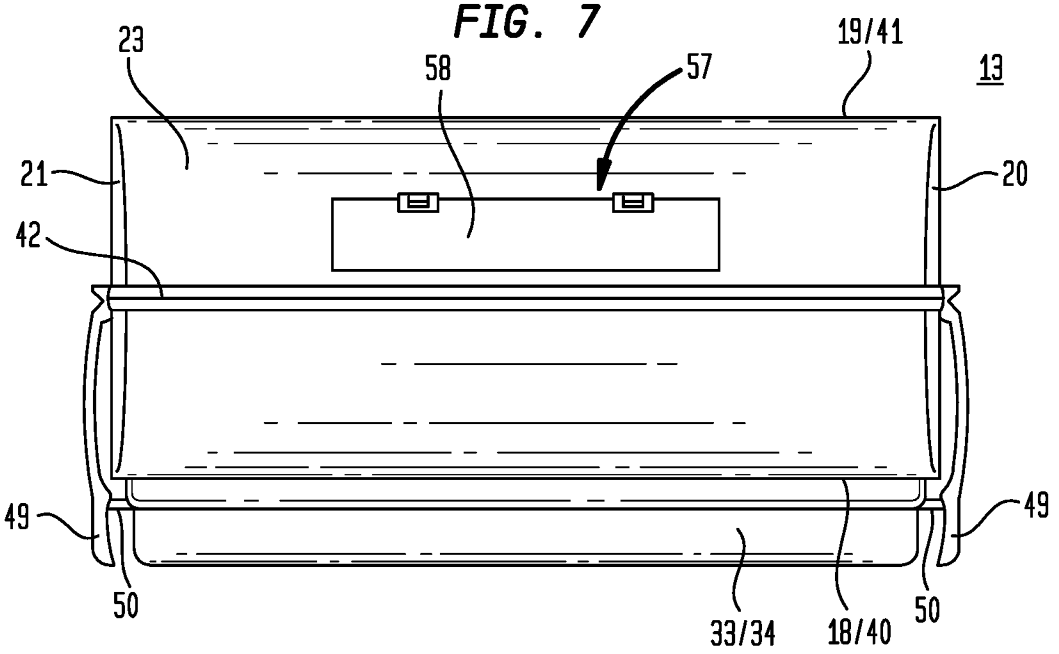
FIG. 7 is a first end view of a particular embodiment of the inventive lint filter.
Figure 8:
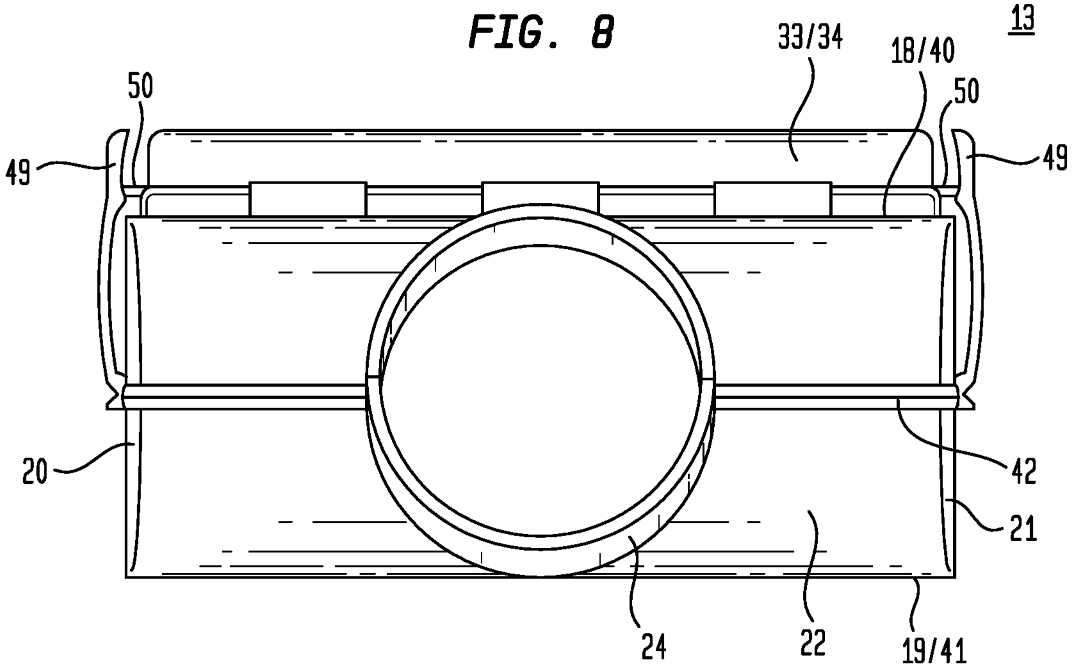
FIG. 8 is a second end view of a particular embodiment of the inventive lint filter.

Now referring primarily to FIGS. 2 through 8, particular embodiments of the lint filter (13) includes a filter housing (15) having an internal wall (16) which defines an interior chamber (17) (as shown in the example of FIGS. 2 and 8). The internal wall (16) includes a flat front panel wall (18) and a flat back panel wall (19) disposed in spaced apart relation connected by a corresponding first side panel wall (20) and second side panel wall (21) and a first curved end panel wall (22) and a second curved end panel wall (23) each having a 180 degree arc disposed in opposed outwardly extending relation (as shown in the examples of FIGS. 2 through 7).

The term "flat" as used for the purposes of this invention means a substantially level or even surface which can include normal variation in fabrication or molding; and while particular embodiments of the invention are shown in the figures as having a flat front panel wall (18) and a flat back panel wall (19) disposed in substantially opposed parallel relation a distance apart (as shown in the example of FIG. 8), other embodiments may dispose the flat front panel wall (18) and flat back panel wall (19) in inwardly or outwardly inclined relation depending upon the application.

As to particular embodiments, the first side panel wall (20) and second side panel wall (21) can be substantially flat and disposed in opposed parallel relation (as shown in the example of FIG. 2); however, other embodiments may provide the first side panel wall (20) and second side panel wall (21) in outwardly or inwardly inclined relation, or may provide the first side panel wall (20) or the second side panel wall (21), or both, with an amount of curvature.

Figure 3:
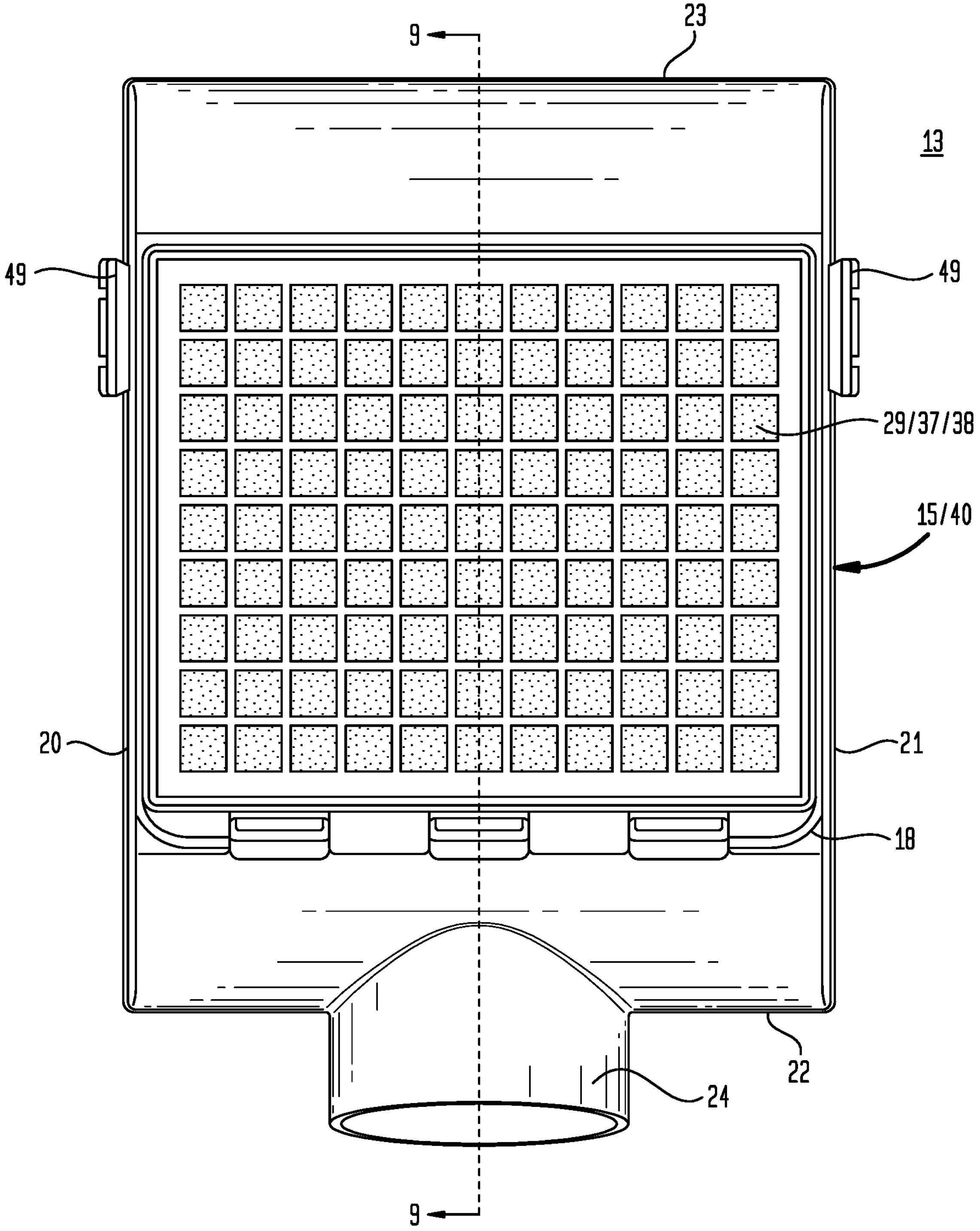
FIG. 3 is a top view of a particular embodiment of the inventive lint filter.
Figure 5:
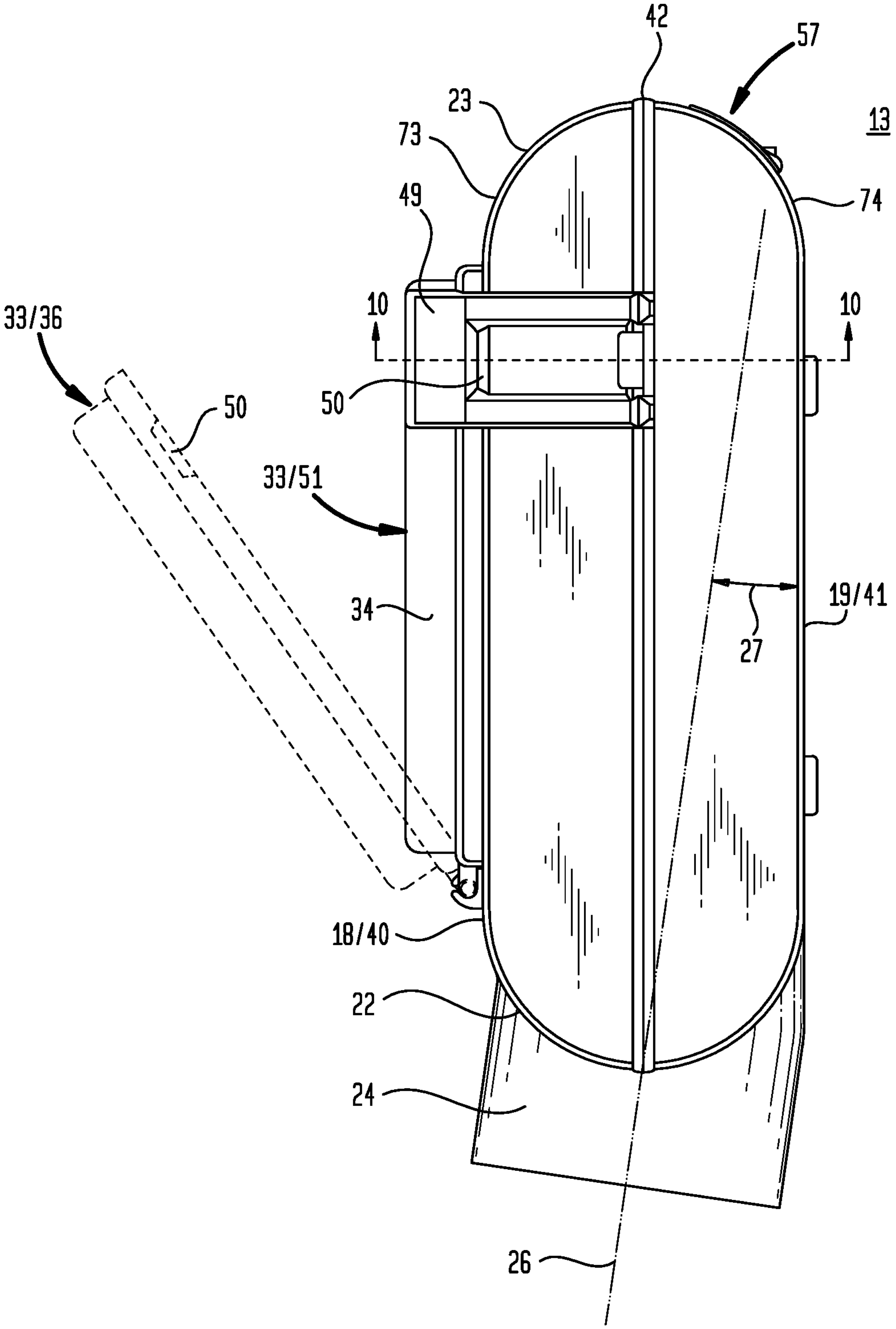
FIG. 5 is first side view of a particular embodiment of the inventive lint filter.

Now referring primarily to FIGS. 3, 5 and 7, particular embodiments of the invention can include a housing inlet (24) joined to the first curved end panel wall (22). The housing inlet (24) can be configured to couple or be retrofitted to an output end (25) of the conduit (6) coupled to the rotatable drum (2) to deliver the exhaust air (8) laden with an amount of lint (10) into the chamber (17) of the lint filter (13). As to particular embodiments, the housing inlet (24) can have a central longitudinal axis (26) which intersects the flat back panel wall (19) at an angle (27) of between about 5 degrees and about 15 degrees.

Now referring primarily to FIGS. 2, 3 and 8, particular embodiments of the invention can include a housing outlet (28) disposed in the flat front panel wall (18) configured to support a filtration material (29) through which exhaust air (8) egresses from the chamber (17) of the lint filter (13). The housing outlet (28) defines an aperture (30) disposed in the flat front panel wall (18) of the filter housing (15) (as shown in the examples of FIGS. 2 and 8). A bezel (31) can surround the aperture (30) and outwardly extend from the external surface (32) of the flat front panel wall (18). The filtration material (29) can be supported within the bezel (31) to engage the external surface (32) of the flat front panel wall (18) (as shown in the example of FIG. 2). A filter retainer (33) including a retainer frame (34) configured to removably sealably engage the bezel (31), and a retainer screen (35) coupled within the retainer frame (34) can be configured to engage the filtration material (29). As to particular embodiments, the filter retainer (33) can be rotatably coupled to the flat front panel wall (18) to operate from an open condition (36) (as shown in the example of FIG. 5 in broken line) which allows the filtration material (29) to be inserted within and removed from the bezel (31) and a closed condition (51) (as shown in the example of FIG. 8) which retains the filtration material (29) within the bezel (31). The filtration material (29) retained within the bezel (31) sufficiently sealably engages the filtration material edges (52) to direct the exhaust air (8) laden with an amount of lint (10) through the filtration material (29). The filtration material (29) can sequester substantially all of the lint (10) in the flow of exhaust air (8). One or more latches (49) pivotally engaged to the external surface of the filter housing (15) can operate to rotatingly latchably engage and disengage from corresponding latch members (50) which extend outwardly from the retainer frame (34).

Now referring primarily to FIGS. 2 and 8, particular embodiments of the invention can provide a filtration material (29) having a "minimum efficiency reporting value" ("MERV") of between about 4 and about 8. The term "minimum efficiency reporting value" or "MERV" for the purposes of this invention means the rating of an air cleaner according to standards set by the ANSI/ASHRAE Standard 52.2-1999. Under the Standard, air cleaners are given MERV ratings based on the results of a series of tests in which test particles are introduced into the air of the testing area. The test particles based on size fall into one of twelve size categories. The smallest particles range from 0.3 to 0.4 micrometers and the largest particles range from 7 to 10 micrometers. The air is then passed through the filter being tested. The density of particles in the air is measured before and after the air passes through the filter to determine how effective the filter is at removing the test particles in each size category. A filtration material (29) having a MERV of between 4 and 8 can effectively remove an amount of lint (10) (and particles which may be components of the amount of lint (10)) from exhaust air (8) from a clothes dryer (1), or other device that generates exhaust air (8) laden with an amount of lint (10), even in the range of between 3 micrometers to 10 micrometers, such as: mold spores, dust mite body parts and droppings, cat and dog dander, hair spray, dusting aids, pudding mix, or other similarly sized particles.

As shown in FIG. 2, as to particular embodiments, the filtration material (29) supported within the bezel (31) can comprise a first filter (36) and a second filter (37). The first filter (36) can comprise a mesh element (38) having open area of between about 50 percent and about 70 percent which supportingly engages the second filter (37) having a MERV of between 4 and 8. As an illustrative example, the first filter (36) can comprise a screen having a mesh of between about 24 and about 28 mesh depending on the diameter of the wire to provide an opening of between about 0.0275 inches to about 0.032 inches, and the second filter (37) can comprise a paint arrestor polyester media filter (39) having a thickness of between about one-half inch to about one inch, having a MERV of about 5.

Figure 4:
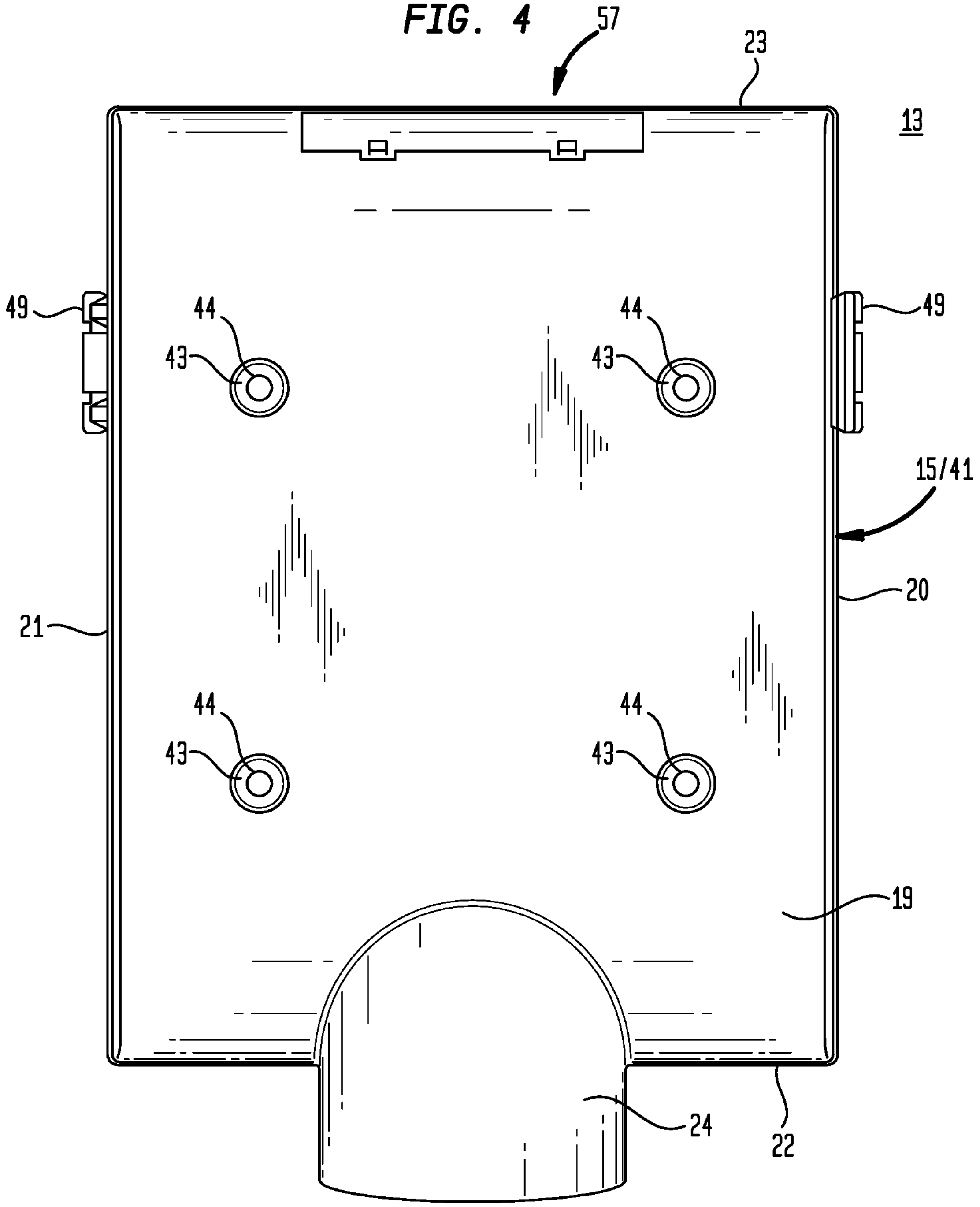
FIG. 4 is bottom view of a particular embodiment of the inventive lint filter.

Now referring primarily to FIG. 2, particular embodiments of the filter housing (15) can include a front filter housing (40) which removably sealably joins a back filter housing (41) at a juncture plane (42) which generally bisects each of the first curved end panel wall (22) and the second curved end panel wall (23) at about 90 degrees of arc (as shown in the example of FIG. 8). The back filter housing (41) can further include one or more lint filter mount elements (43) configured to allow the lint filter (13) to be mounted to a vertical support surface (14). The embodiment of the lint filter (13) shown in FIGS. 2 and 4 provides the lint filter mount elements (43) as being a recess having a central bore (44) which communicates between the internal wall (16) and the external surface (32) of the back filter housing (41) through which a mechanical fastener (45) can pass to secure the back filter housing (41) to a support surface (14). As to particular embodiments, the front filter housing (40) and the back filter housing (41) can each provide a removably matable whole or half tongue and groove (48).

Figure 9:
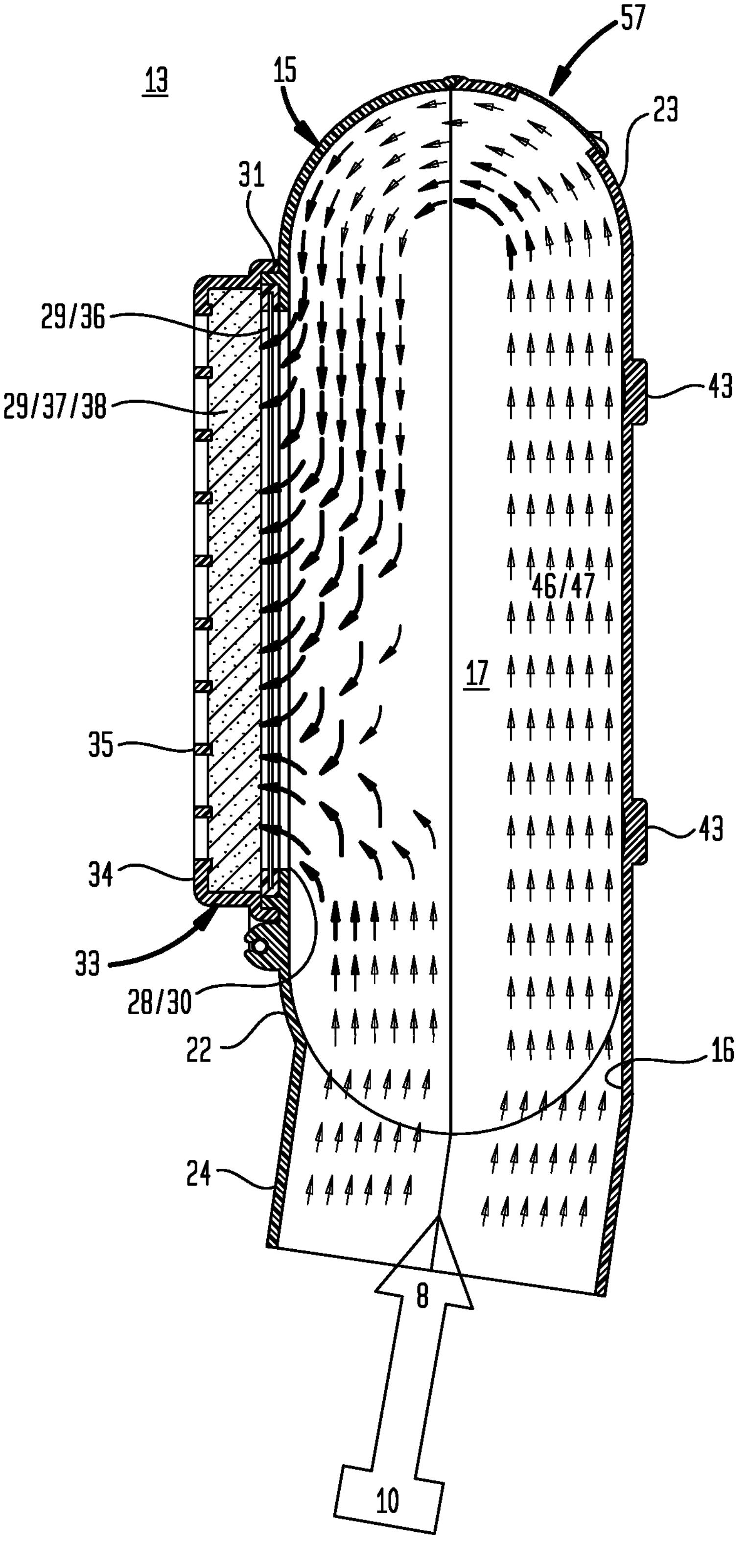
FIG. 9 is a cross section view 9-9 as shown in FIG. 3.
Figure 10:
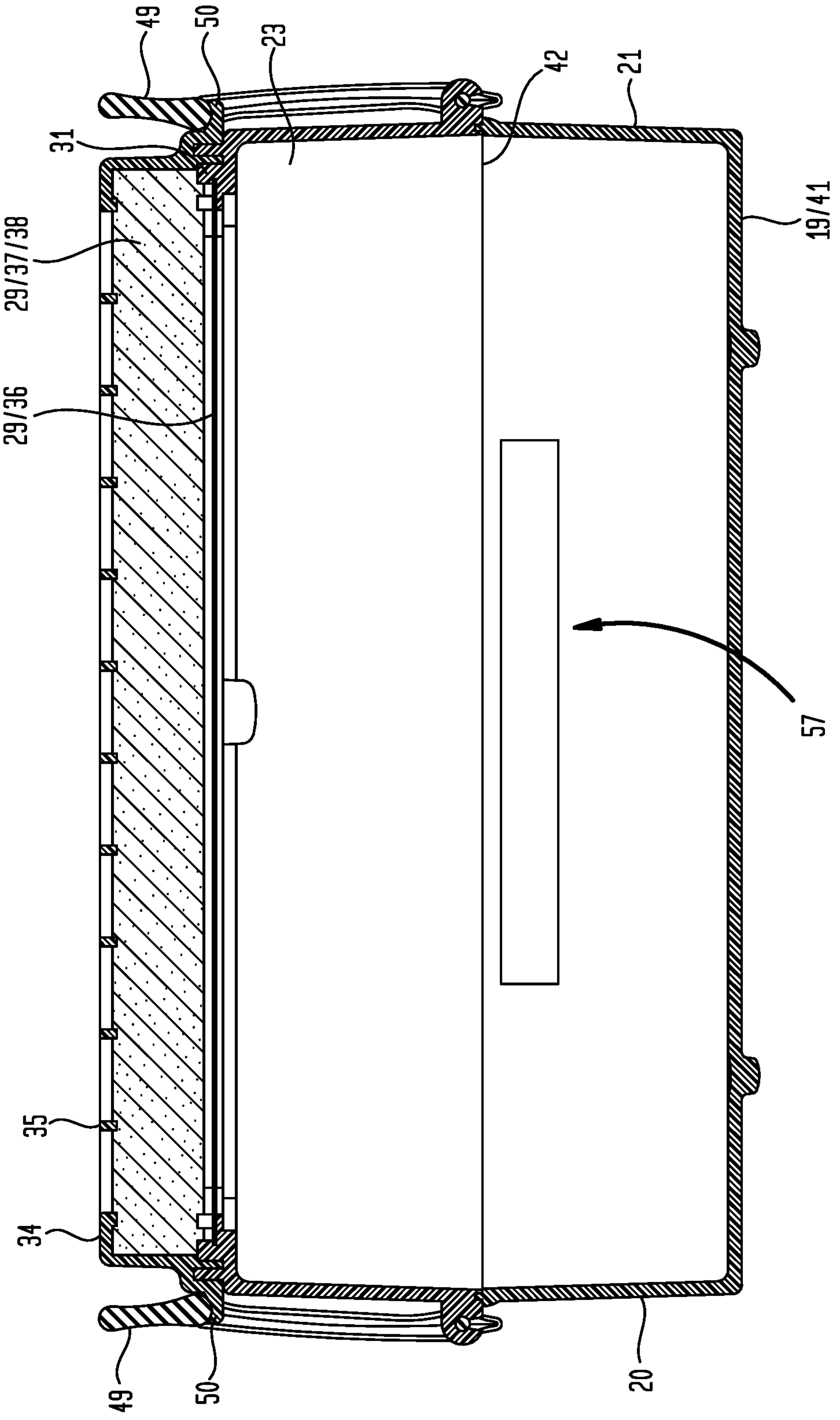
FIG. 10 is a cross section view 10-10 as shown in FIG. 5.

Now referring primarily to FIG. 9, as to particular embodiments, the exhaust air (8) laden with an amount of lint (10) can be delivered into the chamber (17) of the lint filter (13) through the housing inlet (24) disposed in the first curved end panel wall (22) and directed toward the second curved end panel wall (23). The first and second curved end panel walls (22)(23) can generate an advantageous circulation pattern (46) of the exhaust air (8) inside the chamber (17), (as represented by the arrows in the example of FIG. 9), which acts to retain, or increase retention, of the amount of lint (10) in the exhaust air (8) between the housing inlet (24) and the housing outlet (28) of the lint filter (13). Additionally, the advantageous circulation pattern (46) of the exhaust air (8) inside the chamber (17) acts to deposit the amount of lint (10) retained in the exhaust air (8) onto or into the filtration material (29) supported in bezel (31) of the housing outlet (28).

Based on the contours of the internal wall (16) of the filter housing (15), above described, the circulation pattern (46) within the chamber (17) (as represented by the arrows in the example of FIG. 9) can increase, maintain, or reduce loss of laminar flow (47) of the exhaust air (8) between the housing inlet (24) and the housing outlet (28). The term "laminar flow" for the purposes of this invention means exhaust air flow (8) which travels smoothly or in regular paths within the chamber (17) such that exhaust air (8) has substantially constant flow at each point in the chamber (17) as to velocity, pressure or other flow properties. An advantage of achieving enhanced laminar flow (47) can be the reduction in eddies or turbulences which can force an amount of lint (10) out of the exhaust air (8) to deposit on the internal wall (16) of the chamber (17).

As to particular embodiments, based on these contours, the velocity of the exhaust air (8) can be substantially uniform over and through the filtration material (29) (as shown in the example of FIG. 9 arrows representing exhaust air (8) laden with lint (10) having substantially uniform weight at the surface of the filtration material (29)). Additionally, the exhaust air (8) can achieve, maintain, reduce, or increase acceleration within the curve of the second curved end panel wall (23) and near the internal wall (16) downstream of the second curved end panel wall (23) approaching the housing outlet (28) (increasing velocity indicated by increasing size and weight of arrows as shown in the example of FIG. 9). This maintenance, reduced loss or increased velocity assists in retention of the amount of lint (10) within the exhaust air (8) and can produce advantageous forces of impact of the amount of lint (10) with the filtration material (29). In this regard, the velocity of the amount of lint (10) (or lint components) directed by the contours as described can be sufficient to allow impact at sufficient force to be captured by the filtration material (29) but at impact forces which are insufficient to drive the amount of lint (10) through the filtration material (29) into the ambient environment (11).

Now referring primarily to FIGS. 11A through 11C, and 12A through 12E, particular embodiments of the lint filter (13) include a second curved end panel wall (23) having an exhaust aperture element (53) having a periphery (54) which defines an exhaust element aperture opening (53A). While the illustrative example of the periphery (54) shown in the Figures defines a generally rectangular configuration of the exhaust aperture element (53), embodiments can have a periphery (54) which defines a configuration including or consisting of: a circle, an oval, a triangle, a square, a rectangle, a trapezoid, and a polygon, or the like or combinations thereof.

As to particular embodiments having a generally rectangular periphery (54), the exhaust aperture element (53) can have an exhaust aperture element width (55) and an exhaust element aperture length (56). The exhaust aperture element width (55) can be in a range of between about 0.25 inches to about 2.0 inches. As to particular embodiments, the exhaust aperture element width (55) can be selected from the group including or consisting of: between about 0.25 inches to about 0.75 inches, about 0.50 inches to about 1.0 inches, about 0.75 inches to about 1.25 inches, about 1.0 inches to about 1.50 inches, about 1.25 inches to about 1.75 inches, and about 1.50 inches to about 2.0 inches.

The exhaust aperture element length (56) can be in a range of between about 2.0 inches to about 9.0 inches. As to particular embodiments, the exhaust aperture element length (56) can be selected from the group including or consisting of: between about 2.0 inches to about 4.0 inches, between about 3.0 inches to about 5.0 inches, between about 4.0 inches to about 6.0 inches, between about 5.0 inches to about 7.0 inches, between about 6.0 inches to about 8.0 inches, and between about 7.0 inches to about 9.0 inches.

As an illustrative example, an exhaust aperture element (53) can have a periphery (54) defining a rectangle having an exhaust aperture element width (55) of about 0.625 inches and an exhaust aperture element length (56) of about 4.0 inches.

Figure 11A:
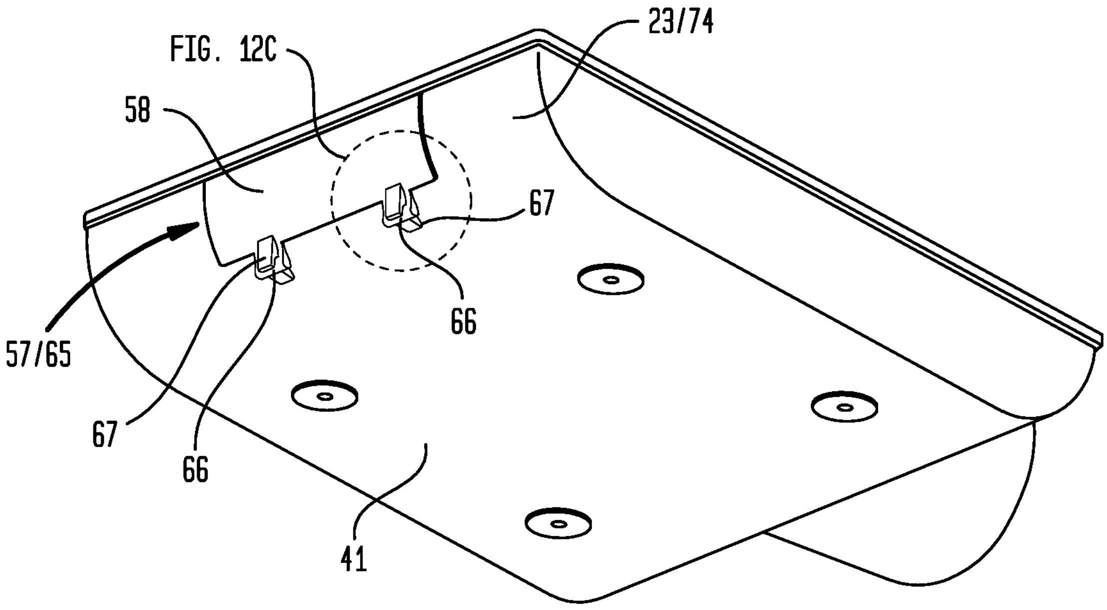
FIG. 11A is a perspective view of a particular embodiment of the inventive lint filter.
Figure 11B:
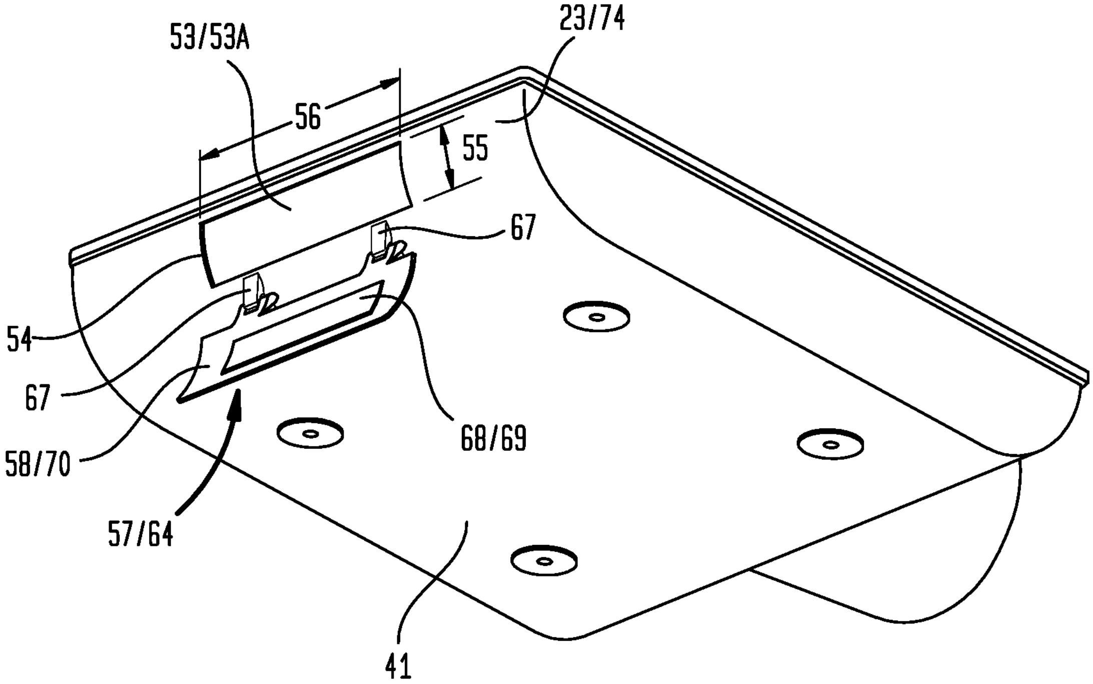
FIG. 11B is a perspective view of a particular embodiment of the inventive lint filter.

Now referring primarily to FIGS. 11A and 11B, particular embodiments of the lint filter (13) include a second curved end panel wall (23) having an exhaust aperture element (53) and a cover element (57). The cover element (57) can be coupled in relation to the second curved panel wall (23) to allow movement between a closed condition (65) (as shown in the example of FIG. 11A) and an open condition (64) (as shown in the example of FIG. 11B). As to particular embodiments (as shown in the examples of FIG. 2, FIG. 4 through FIG. 7, and FIG. 9 through FIG. 11B), the cover element (57) in the closed condition (65) can cover the entirety of the exhaust aperture element opening (53A).

Figures 12A, 12B, 12C, 12D, 12E:
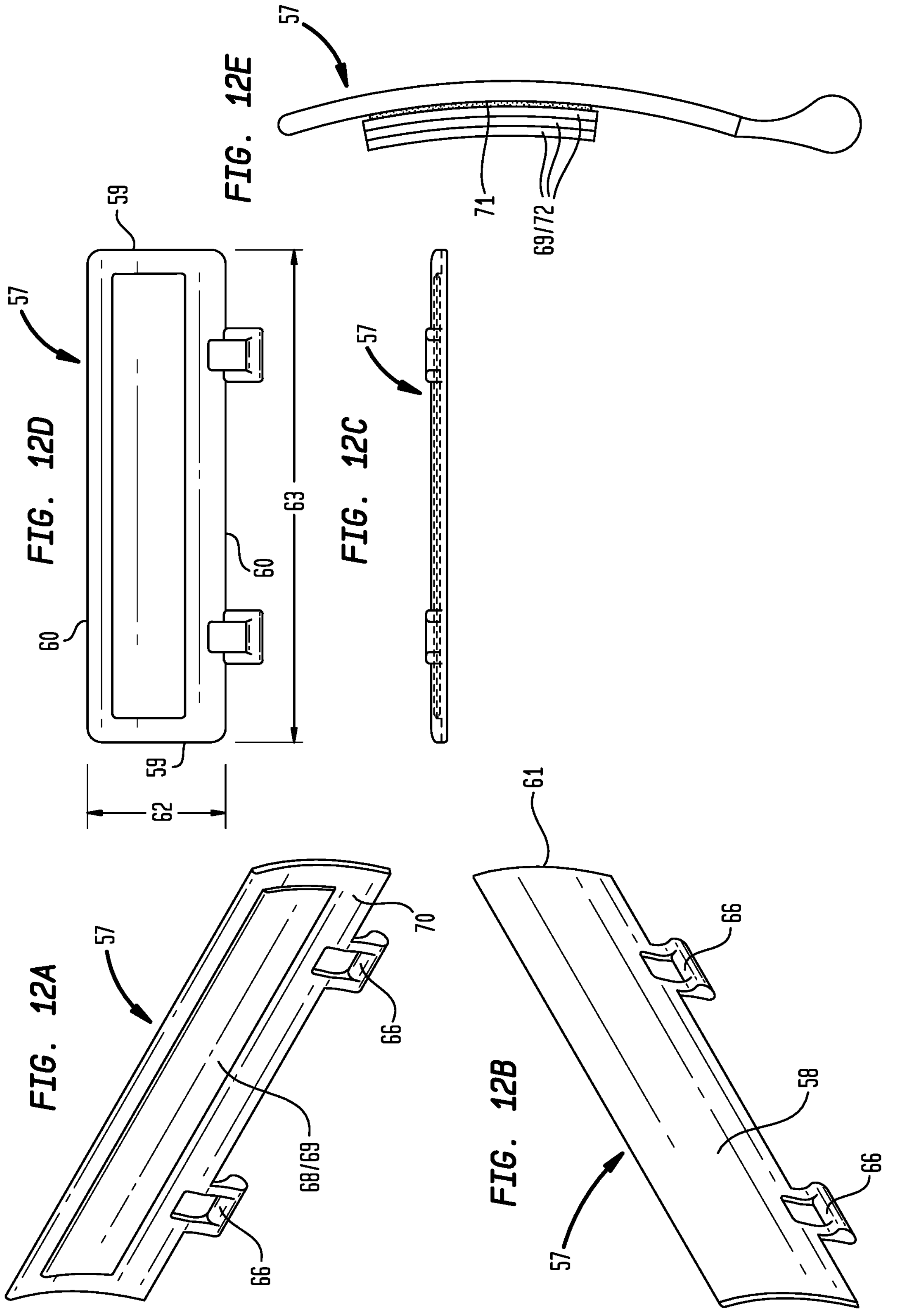
FIG. 12A is a perspective view of a particular embodiment of a cover element included in the inventive lint filter.
FIG. 12B is a perspective view of a particular embodiment of a cover element included in the inventive lint filter.
FIG. 12C is a perspective view of a particular embodiment of a cover element included in the inventive lint filter.
FIG. 12D is a perspective view of a particular embodiment of a cover element included in the inventive lint filter.
FIG. 12E is a perspective view of a particular embodiment of a cover element included in the inventive lint filter.

Now referring primarily to FIG. 12A through FIG. 12C, the cover element body (58) can include a body periphery (61) defining a configuration which can cover the entirety of the exhaust aperture element opening (53A). As to particular embodiments, the body periphery (61) can define a cover element body (58) selected from the group including or consisting of: a circle, an oval, a triangle, a square, a rectangle, a trapezoid, a polygon, or the like, or combinations thereof.

In the illustrative example shown in FIG. 12D, the cover element body (58) can be bounded by a body periphery (61) of generally a rectangular configuration having a body length (63) disposed between a first pair of cover element sides (59) and a body width (62) disposed between a second pair of cover element sides (60). As to particular embodiments, the body width (62) of the rectangle defined by the cover element (57) body periphery (61) can be in a range of between about 0.25 inches to about 2.5 inches. The body width (62) of the rectangle defined by the cover element (57) body periphery (61) can be selected from the group including or consisting of: between about 0.25 inches to about 0.75 inches, about 0.50 inches to about 1.0 inches, about 0.75 inches to about 1.25 inches, about 1.0 inches to about 1.50 inches, about 1.25 inches to about 1.75 inches, about 1.50 inches to about 2.0 inches, about 1.75 inches to about 2.25 inches, and about 2.0 inches to about 2.5 inches.

As to particular embodiments, the body length (63) of the rectangle defined by the cover element (57) body periphery (61) can be in a range of between about 2.0 inches to about 10.0 inches. The body length (63) of the rectangle defined by the cover element (57) body periphery (61) can be selected from the group including or consisting of: between about 2.0 inches to about 4.0 inches, between about 3.0 inches to about 5.0 inches, between about 4.0 inches to about 6.0 inches, between about 5.0 inches to about 7.0 inches, between about 6.0 inches to about 8.0 inches, and between about 7.0 inches to about 9.0 inches.

As an illustrative example, a cover element (57) body periphery (61) can define a rectangle having a body width (62) of about 0.625 inches and a body length (63) of about 4.0 inches.

Now referring primarily to FIGS. 12A, 12B and 12E, embodiments of the cover element body (58) can have a body internal surface (70) configured to sealably engage the external surface (32) of the second curved end panel wall (23) in the closed condition (65). As to the embodiment shown in the Figures, the body internal surface (70) can be curved over the body width (62) such that in the closed condition (65), the body internal surface (70) matingly engages the external surface (32) of the second curved end panel wall (23).

Figure 11C:
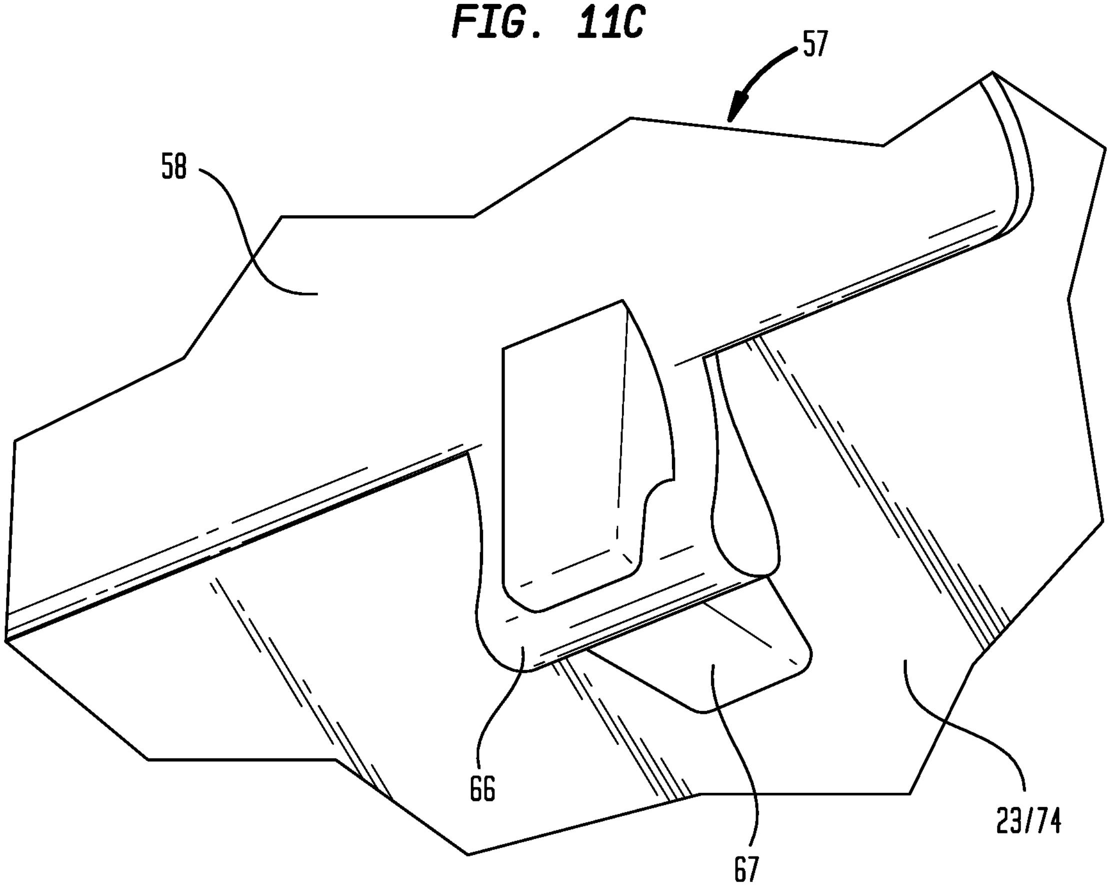
FIG. 11C is a perspective view of a particular embodiment of the inventive lint filter.

Now referring primarily to FIG. 11A through FIG. 11C, the cover element (57) can be rotatably coupled to the second curved end panel wall (23) to operate between the open condition (64) and the closed condition (65). As an illustrative example shown in FIG. 6, FIG. 12A and FIG. 12B, the cover element (57) can be rotatably coupled to the second curved end panel wall (23) by one of a second pair of cover element sides (60) to operate from an open condition (64) (as shown in the example of FIG. 6 in broken line and FIG. 11B), which allows the exhaust air (8) to flow from the chamber (17) through the exhaust aperture element opening (53A) into the ambient environment (11), and a closed condition (65) (as shown in the example of FIG. 6 and FIG. 11A) which impedes the flow of the exhaust air (8) from the chamber (17) through the exhaust aperture element opening (53A) into the ambient environment (11). As to particular embodiments, one or more pivot elements (66) can be coupled to one of the second pair of cover element sides (60). The pivot elements (66) can be rotatably engaged with corresponding pivot receiving members (67) coupled to the external surface (32) of the second curved end panel wall (23).

As to particular embodiments, a weight element (68) can be coupled to the cover element (57) to urge the cover element (57) toward the closed condition (65). The weight assembly (68) can include any material having an amount of weight. As an illustrative example, a weight element (68) can be a magnet (69) which, as an illustrative example, can take the form of a magnetic strip. As to particular embodiments, the weight element (68) can be coupled to the cover element (57) by mechanical fasteners, an adherent, hook and loop fastener, or the like, or combinations thereof.

As an illustrative example, the weight element (68) can take the form of a magnet (69) coupled to the internal surface (70) of the cover element body (58) at a location which positions the weight element (68) within the exhaust aperture element opening (53A). The magnet (69) can be configured to provide a sufficient amount of weight to maintain engagement of the cover element body (58) with the second curved end panel wall (23) when the exhaust air (8) within the chamber (17) comprises a first amount of pressure and disengage from the second curved end panel wall (23) when the exhaust air (8) within the chamber (17) comprises a second amount of pressure sufficient to overcome the amount of weight and move the cover element body (58) toward the open condition (64).

As to other particular embodiments, the magnet (69) can be coupled to an external surface (32) of the cover element body (58). The magnet (69) can be configured to provide a sufficient amount of weight to maintain engagement of the internal surface (70) of the cover element body (58) with the an external surface (32) of the second curved end panel wall (23) when the exhaust air (8) within the chamber (17) comprises a first amount of pressure and disengage from the second curved end panel wall (23) when the exhaust air (8) within the chamber (17) comprises a second amount of pressure sufficient to overcome the amount of weight and move the cover element body (58) toward the open condition (64).

As to particular embodiments, the weight element (68) can take the form of a plurality of weight elements (72) which can be combined in various combinations to adjust the amount of weight coupled to the cover element body (58). As to particular embodiments, the plurality of weight elements (72) can be in form of a plurality of magnets (69). The first of the plurality of magnets (69) can be fastened to the external surface (32) or the internal surface (70) of the cover element body (58) (as shown in the example of FIG. 12E in which an amount of adherent (71) maintains the first of the plurality of magnets (69) in fixed engagement with the internal surface (70) of the cover element body (58)). A second or more of the plurality of magnets (69) can be magnetically coupled to the first of the plurality of magnets (69) to adjustably increase the amount of weight. The second or more of the plurality of magnets (69) can be magnetically uncoupled from the first of the plurality of magnets (69) to adjustably decrease the amount of weight. The amount of weight can be adjusted by addition or substation of the second or more of the plurality of magnets (69) to provide an amount of weight coupled to the cover element (57) to maintain engagement with the second curved end panel wall (23) when the exhaust air (8) within the chamber (17) comprises a first amount of pressure resultant from the resistance to flow of exhaust air (8) through the lint filter (13) in normal operation of the clothes dryer (1) and to disengage from the second curved end panel wall (23) when the exhaust air (8) within the chamber (17) comprises a second amount of pressure resultant from increased resistance to flow of exhaust air (8) through the lint filter (13). The first and second amounts of pressure can be determined by adjusting the amount of weight during normal operation of the clothes dryer (1) subsequent to installation of fresh filtration material (29) which defines the first amount of pressure.

The cover element (57) can disengage from the second curved end panel wall (23) when the exhaust air (8) within the chamber (17) comprises a second amount of pressure resultant from an amount of obstruction to flow of the exhaust air (8) through the filtration material (29) (also referred to as the "obstructed condition"). As an illustrative example, an obstructed condition can result from an obstruction of the exhaust air (8) flowing through the filtration material (29) by a percent amount in a range of between about 50% to about 100%. The percent amount can be selected from the group including or consisting of: between about 50% to about 60%, between about 55% to about 65%, between about 60% to about 70%, between about 65% to about 75%, between about 70% to about 80%, between about 75% to about 85%, between about 80% to about 90%, between about 85% to about 95%, and between about 90% to about 100%.

As an illustrative example, the amount of weight coupled to the cover element (57) can be adjusted to cause disengagement of the cover element (57) from the second curved end panel wall (23) when the exhaust air (8) within the chamber (17) comprises a greater pressure resulting from the filtration material (29) having an obstructed condition of about 80%, or other selected percentage depending upon the application.

As to particular embodiments, the cover element (57) can be configured to remain in an open condition (64) until manually returned to the closed condition (65). For example, when a cover element (57) disengages from the second curved end panel wall (23) due to exhaust air (8) within the chamber (17) reaching the second pressure resulting from the filtration material (29) having an obstructed condition of about 80% (or other selected percentage of obstruction), the cover element (57) can remain in the open condition (64), thereby visible to a user and, correspondingly, providing a visual indicator to the user that the filtration material (29) may require maintenance to remove an amount of lint (10) or other obstruction or replacement. Once the filtration material (29) has been maintenanced, the cover element (57) can be manually returned to the closed condition (65) by the user.

Now referring primarily to FIG. 5, FIG. 11A and FIG. 11B, the second curved end panel wall (23) can include a front second curved end panel wall portion (73) opposite a back second curved end panel wall portion (74). As to particular embodiments, the front second curved end panel wall portion (73) can include the exhaust aperture element (53) and the cover element (57) configured to cover a portion of the exhaust aperture element opening (53A). As to other particular embodiments, the back second curved end panel wall portion (74) can include the exhaust aperture element (53) and the cover element (57) configured to removably cover a portion of the exhaust aperture element opening (53A).

Figure 13:
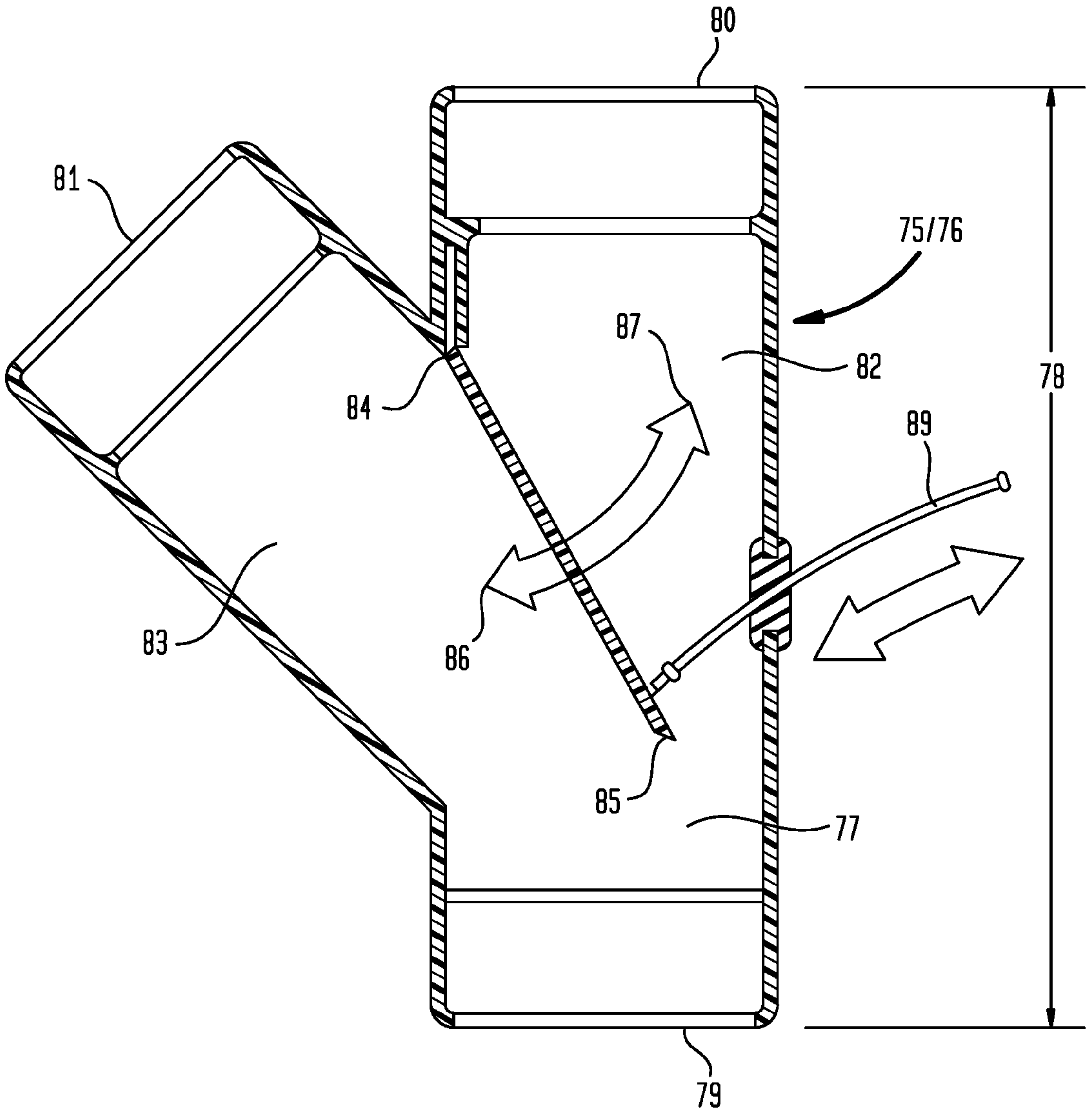
FIG. 13 is a cross section view 12-12 of a particular embodiment of an exhaust director as shown in FIG. 1.

Now referring primarily to FIG. 1 and FIG. 13, the clothes dryer (1) can further include an exhaust air director (75) coupled to the conduit (6) between the drum (2) of the clothes dryer (1) and the lint filter (13). The exhaust air director (75) can include a wye member body (77) including a first tubular conduit (82) having longitudinal length (78) disposed between an inlet end (79) and a first outlet end (80) and a second tubular conduit (83) coupled in angle relation to the first tubular conduit (82) providing a second outlet end (81). A wye member (76) can be coupled by a wye element first end (84) inside the wye member body (77) to allow a wye element second end (85) to travel between a first position (86) inside the wye member body (77) at which the wye member body (77) directs exhaust air (8) flowing from the inlet end (79) toward the first outlet end (80) and a second position (87) inside the wye member body (77) at which the wye member body (77) directs exhaust air (8) flowing from the inlet end (79) toward the second outlet end (81). An adjusting element (89) can be configured to adjust the wye element second end (85) between a first position (86) inside the wye member body (77) at which the wye member body (77) directs exhaust air (8) flowing from the inlet end (79) toward the first outlet end (80) and a second position (87) inside the wye member body (77) at which the wye member body (77) directs exhaust air (8) flowing from the inlet end (79) toward the second outlet end (81). As to particular embodiments, the first outlet end (80) can direct a first portion of exhaust air (8) to an interior space (12) and the second outlet end (81) can direct a second portion of exhaust air (8) to an exterior space. For example, the exhaust director (75) can allow a user to direct exhaust air (8) from the drum (2) to an interior building space (12) from the lint filter (13) or to an exterior building space through an exhaust air duct (88), or to a combination thereof.

As can be easily understood from the foregoing, the basic concepts of the present invention may be embodied in a variety of ways. The invention involves numerous and varied embodiments of a lint catching system and methods for making and using such lint catching system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "filter" should be understood to encompass disclosure of the act of "filtering"—whether explicitly discussed or not—and, conversely, were there effectively disclosure of the act of "filtering", such a disclosure should be understood to encompass disclosure of a "filter" and even a "means for filtering." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the lint catching systems or lint catching devices herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A lint catching system, comprising:

a filter housing having an interior chamber defined by an internal wall;

a filter housing inlet disposed in said filter housing;

a filter housing outlet disposed in said filter housing;

a filtration material overlaying said filter housing outlet;

an exhaust aperture element disposed in said filter housing to communicate with said interior chamber;

a cover element rotatably connected to said filter housing to overlay an external surface of said filter housing, said cover element configured to cover said exhaust aperture element when exhaust air within said interior chamber comprises a first amount of pressure, and uncover said exhaust aperture element when said exhaust air within said interior chamber comprises a second amount of pressure which urges said cover element away from said exhaust aperture element; and a weight element removably fixed to said cover element by magnetic coupling or an adherent, wherein said weight element urges said cover element toward covering said exhaust aperture element.

2. The lint catching system of claim 1, wherein said second amount of pressure is provided by an obstructed condition of the filtration material supported in said filter housing.

3. The lint catching system of claim 1, wherein said filter housing outlet disposes in a front panel wall which comprises said internal wall.

4. The lint catching system of claim 1, wherein said weight element facilitates:

(i) engagement of said cover element with said filter housing when said exhaust air within said interior chamber comprises said first amount of pressure; and (ii) disengagement of said cover element from said filter housing when said exhaust air within said interior chamber comprises said second amount of pressure.

5. The lint catching system of claim 1, wherein said second amount of pressure is sufficient to overcome the amount of weight provided by said weight element and urge said cover element toward an open condition.

6. The lint catching system of claim 1, wherein said weight element comprises a plurality of weight elements operable to provide an adjustable amount of weight, the plurality of weight elements including a first weight element fastened to the cover element in fixed engagement, and a second weight element magnetically and removably coupled to the first weight element.

7. The lint catching system of claim 1, wherein the weight element is a second magnet removably fixed to the cover element by magnetic coupling to a first magnet, wherein said first magnet is fastened to said cover element, and said second magnet urges said cover element toward covering said exhaust aperture element with an adjustable amount of weight.

8. The lint catching system of claim 7, wherein said first magnet and said second magnet facilitate:

(i) engagement of said cover element with said filter housing when said exhaust air within said interior chamber comprises said first amount of pressure; and (ii) disengagement of said cover element from said filter housing when said exhaust air within said interior chamber comprises said second amount of pressure.

9. The lint catching system of claim 7, wherein said second amount of pressure is sufficient to overcome a magnetic force of said first magnet and said second magnet, and urge said cover element toward an open condition.

10. The lint catching system of claim 7, further comprising a plurality of magnets removably coupled to said second magnet to provide an adjustable amount of magnetic force.

11. The lint catching system of claim 1, further comprising a plurality of weight elements including said weight element as a second weight element, wherein said plurality of weight elements includes a first weight element, fastened to an internal surface of said cover element by an adherent or a mechanical fastener, and said second weight element is magnetically coupled to said cover element through said first weight element on said internal surface.

12. A lint catching system, comprising:
a filter housing having an interior chamber defined by an internal wall;
a filter housing inlet disposed in said filter housing;
a filter housing outlet disposed in said filter housing;
an exhaust aperture element disposed in said filter housing to communicate with said interior chamber;
a cover element rotatably connected to said filter housing to overlay an external surface of said filter housing, said cover element configured to operate between a closed condition and an open condition; and
a weight element removably fixed to said cover element by magnetic coupling or an adherent, wherein said weight element urges cover element toward said closed condition;
wherein in said closed condition, said cover element impedes flow of exhaust air from said interior chamber through said exhaust aperture element; and
wherein in said open condition generated by an obstructed condition of a filtration material supported in said filter housing, said cover element allows said exhaust air to flow from said interior chamber through said exhaust aperture element.

13. The lint catching system of claim 12, wherein an obstructed condition of the filtration material supported in said filter housing causes an increase in pressure in the filter housing that urges the cover element toward the open condition.

14. The lint catching system of claim 12, wherein said filter housing outlet disposes in a front panel wall which comprises said internal wall.

15. The lint catching system of claim 12, wherein said weight element facilitates:
(i) disposition of said cover element in said closed condition when exhaust air within said interior chamber comprises a first amount of pressure; and
(ii) disposition of said cover element in said open condition when said exhaust air within said interior chamber comprises a second amount of pressure.

16. The lint catching system of claim 15, wherein said second amount of pressure is sufficient to overcome the amount of weight provided by said weight element and urge said cover element toward said open condition.

17. The lint catching system of claim 12, wherein said weight element comprises a plurality of weight elements operable to provide an adjustable amount of weight, the plurality of weight elements including a first weight element fastened to the cover element, and a second weight element magnetically and removably coupled to the first weight element.

18. The lint catching system of claim 12, further comprising a magnet removably coupled to said weight element on said cover element, said magnet configured to urge said cover element toward said closed condition.

19. The lint catching system of claim 18, wherein said magnet facilitates:
(i) disposition of said cover element in said closed condition when exhaust air within said interior chamber comprises a first amount of pressure; and
(ii) disposition of said cover element in said open condition when said exhaust air within said interior chamber comprises a second amount of pressure.

20. The lint catching system of claim 19, wherein said second amount of pressure is sufficient to overcome a magnetic force of said magnet and urge said cover element toward said open condition.

21. The lint catching system of claim 18, wherein said magnet comprises a plurality of magnetic strips removably coupled to said weight element on said cover element to provide an adjustable amount of weight on the cover element.

22. A lint catching system, comprising:
a filter housing having an interior chamber defined by an internal wall;
a filter housing inlet disposed in said filter housing;
a filter housing outlet disposed in said filter housing;
a filtration material operably coupled to said filter housing outlet;
an exhaust aperture element disposed in said filter housing to communicate with said interior chamber;
a cover element rotatably connected to said filter housing to overlay an external surface of said filter housing, said cover element configured to cover said exhaust aperture element when exhaust air within said interior chamber comprises a first amount of pressure, and uncover said exhaust aperture element when said exhaust air within said interior chamber comprises a second amount of pressure which urges said cover element away from said exhaust aperture element; and
a weight element removably fixed to said cover element by magnetic coupling or an adherent, wherein said weight element urges said cover element toward covering said exhaust aperture element.

* * * * *